Nov. 24, 1953  M. KELLER  2,660,330
PRESSURE COOKER
Filed Jan. 9, 1952  4 Sheets-Sheet 1
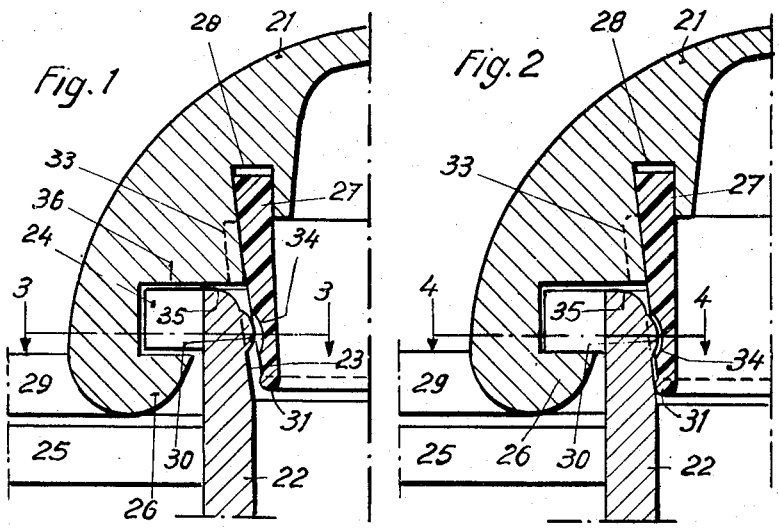
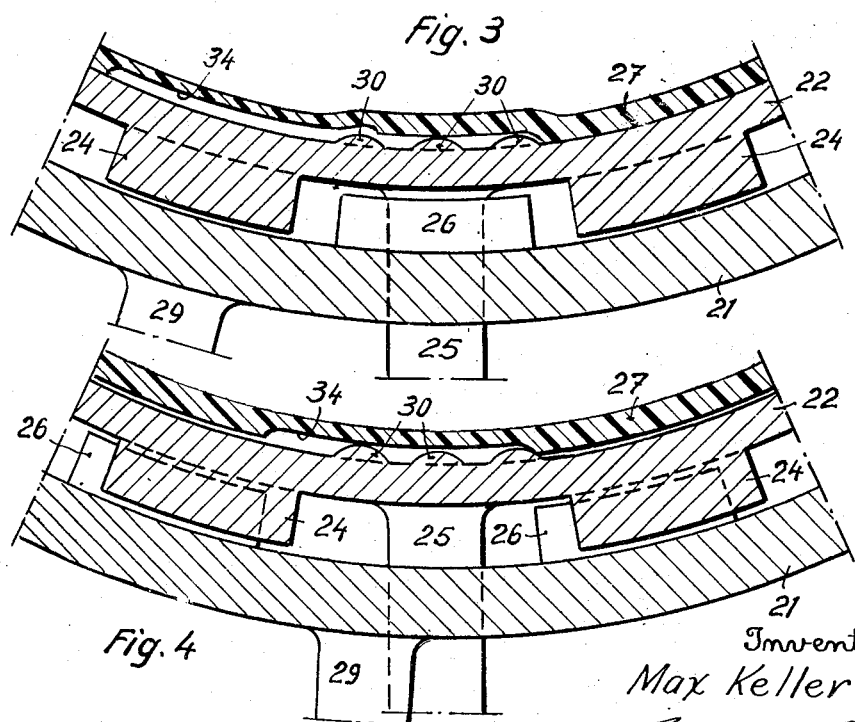
Inventor
Max Keller
By
Patent Agent Nov. 24, 1953     M. KELLER     2,660,330
PRESSURE COOKER
Filed Jan. 9, 1952     4 Sheets-Sheet 2
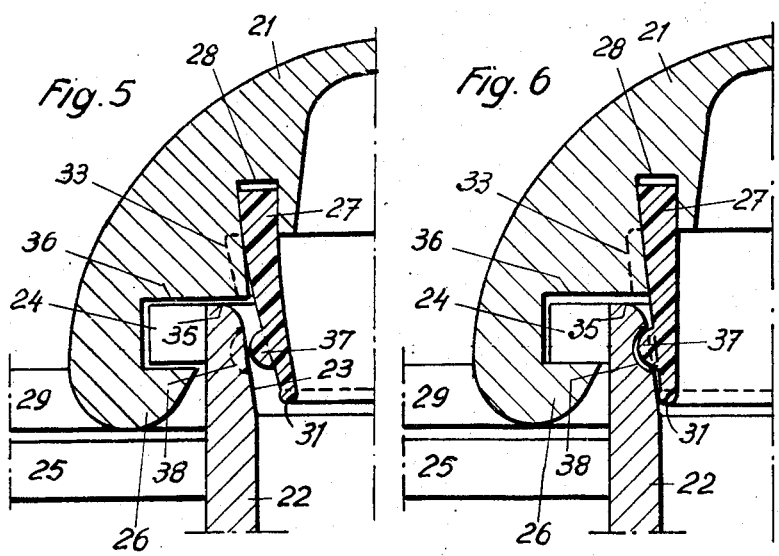
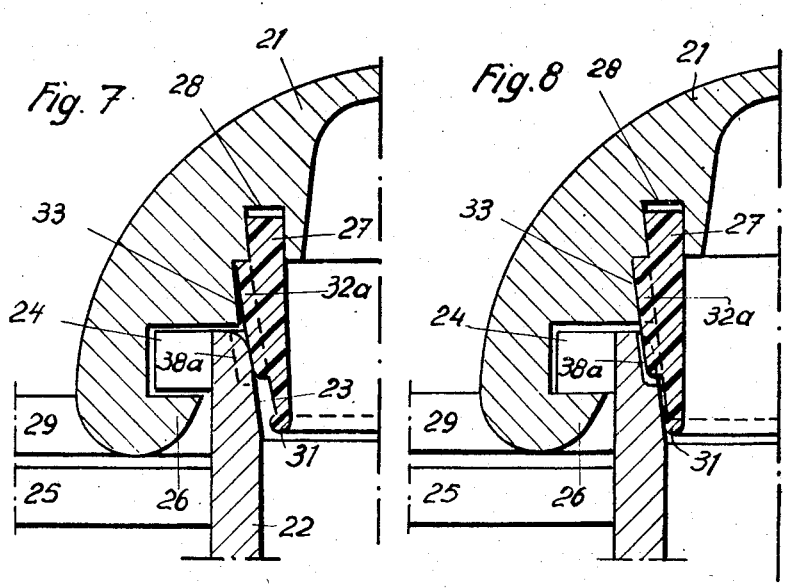
Inventor
Max Keller
By [signature]
Patent Agent Inventor: Max Keller
By Eric D. Frankel
Patent Agent Nov. 24, 1953     M. KELLER     2,660,330
PRESSURE COOKER
Filed Jan. 9, 1952     4 Sheets-Sheet 4
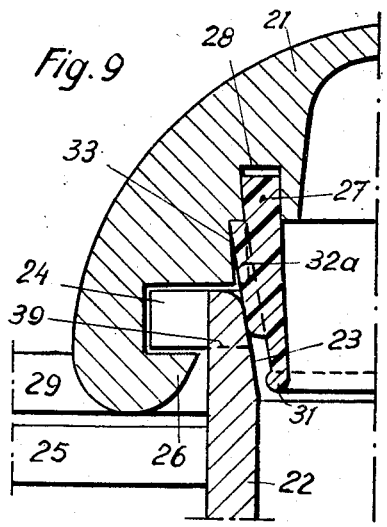
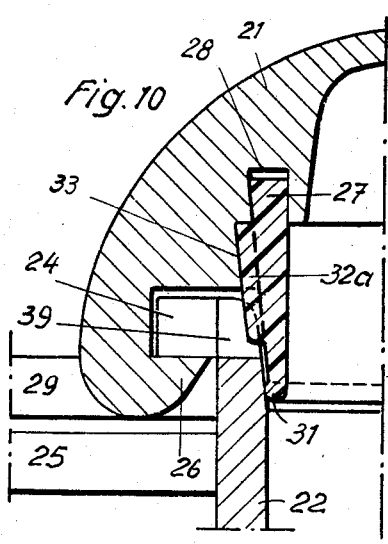
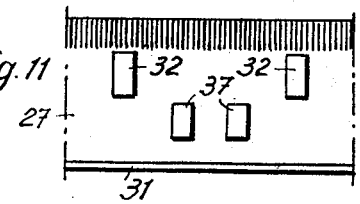
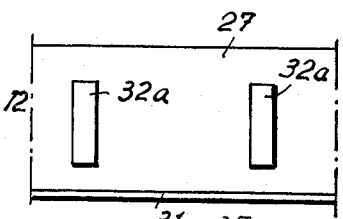
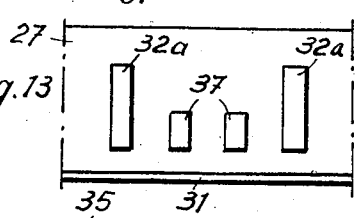
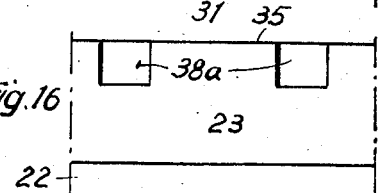
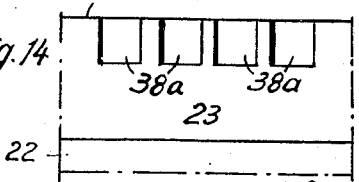
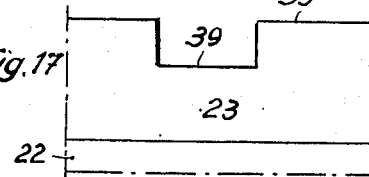
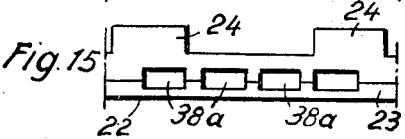
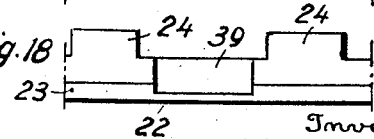
Inventor
Max Keller
By *Eric D. Kunkel*
Patent Agent.

Patented Nov. 24, 1953

2,660,330

UNITED STATES PATENT OFFICE 2,660,330

PRESSURE COOKER

Max Keller, Zurich, Switzerland

Application January 9, 1952, Serial No. 265,607

12 Claims. (Cl. 220—40)

The invention relates to a pressure cooker which consists of a pot and a lid adapted to be put on the pot and in which both the edge of the pot and the lid are provided with lugs which together form a bayonet catch which, on rotating the lid, that has been put on the pot, in one direction, is adapted to be brought into the locking position in which a packing ring, that is arranged on the lid, forms an hermetic closure of the inside of the pot, means being provided for connecting the inside of the pot with the atmosphere after the lid has been put on the pot, which means are, for the purpose of producing the hermetic closure of the inside of the pot, inoperative after the lugs of the lid have been pushed partly beneath the lugs on the edge of the pot.

The pressure cooker according to the invention differs from the known pressure cookers in that on one part, i. e., the pot or the packing ring, bosses are arranged and, on the other part, depressions are arranged, the bosses, when the lid has been put on the pot and is being rotated into the locking position, preventing an application of the packing ring to the sealing surface of the pot until, on rotation of the lid into the locking position, the co-operation of the bosses and the depressions by the engagement of the former in the latter takes place.

A few embodiments of the subject matter of the invention are represented in the accompanying drawings, of which Figs. 1 and 2 are each a vertical section through a part of a pressure cooker according to the first embodiment, Fig. 1 showing it after the lid has been put on the pot and Fig. 2 showing it after the lid has been rotated into the locking position;

Figs. 3 and 4 are respectively a section on the line 3—3 of Fig. 1 and a section on the line 4—4 of Fig. 2;

Figs. 5, 6 and 5a, 6a are vertical sections through parts of the pressure cookers according to the second embodiment, Figs. 5a and 6a being a slight modification of the embodiment of Figs. 5 and 6, respectively. Figs. 5 and 5a show the cookers after the lids have been put on the pots and Figs. 6 and 6a show the cookers after the lids have been rotated into the locking positions;

Figs. 7 and 8 are each a vertical section through a part of a pressure cooker according to the third embodiment, Fig. 7 showing it after the lid has been put in the pot and Fig. 8 showing it after the lid has been rotated into the locking position;

Figs. 9 and 10 are each a vertical section through a part of the pressure cooker according to the fourth embodiment, Fig. 9 showing it after the lid has been put on the pot and Fig. 10 showing it after the lid has been rotated into the locking position;

Figs. 11, 12 and 13 show in elevation the exterior of a part of the packing ring of three different embodiments;

Fig. 14 shows in elevation a part of the inside of a pot of a first embodiment, which part is shown in Fig. 15 in plan;

Figs. 16 and 17 show in elevation the inside of a pot of two further embodiments respectively, whilst Fig. 18 is a plan of the part of the pot shown in Fig. 17.

Figure 5A:
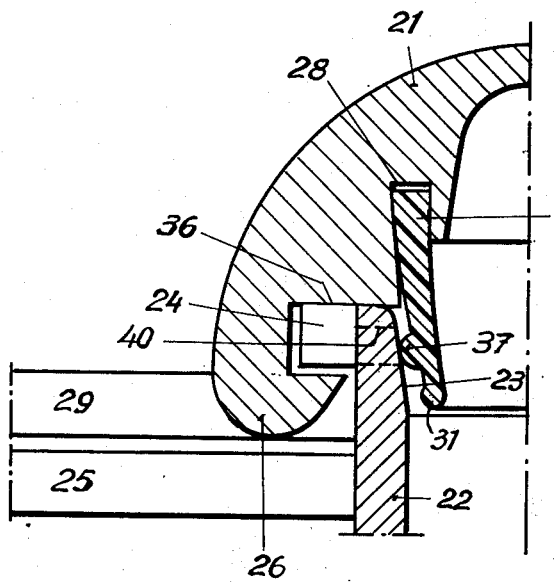

21 denotes the lid to be employed for closing the pot 22. The pot 22 has, at its open end, a conical surface 23, which widens towards the edge of the pot and serves as a sealing surface, and also a mouth flange having a number of lugs 24. It also has a handle 25. The lid 21 is pulled down over the edge of the pot and bears, on its overlapping portion, a number of lugs 26 which corresponds to the number of lugs 24 and which, on the rotation of the lid that has been put on the pot, are moved to beneath the lugs 24. The lid 21 has, on its inside, a groove 28 which serves for receiving a packing ring 27. For the purpose of grasping and rotating the lid 21, the latter bears a handle 29.

In the case of the embodiment shown in Figs. 1 to 4, bosses 30 are provided on the conical sealing surface 23 of the pot 22. The packing ring 27 has, on its outer side, an edge bead 31 with which it lies on the conical sealing surface 23 of the pot only when in the sealing position (Fig. 2), so that the frictional resistance between the pot and the packing ring when the lid is rotated into the locking position or from the locking position into the position of release is very small and can, in practice, be neglected. The packing ring 27 has, in addition, two bosses 32 (Fig. 11) which lie in grooves 33 (Figs. 1 and 2) in the lid 21 (Figs. 1 and 2) and prevent the packing ring 27 from changing its position in relation to the lid when the latter is rotated in one direction or the other. The packing ring also has a groove-shaped depression 34.

On putting the lid 21 on the pot 22 (Figs. 1 and 3), the bosses 30 on the pot effect a lifting of the edge bead 31 of the packing ring 27 from the conical sealing surface 23 of the pot, since the packing ring comes to lie over these bosses 30 with a part having the full cross-section. There is therefore communication between the interior of the pot and the atmosphere through the interspaces between the bosses 30 and those between the edge 35 of the pot and the surface 36 on the lid 21, which surface is parallel to the edge 35 of the pot, this communication preventing an increase of pressure in the interior of the pot. If the lid 21 is rotated into the locking position, which is reached when the handle 29 of the lid lies approximately over the handle 25 of the pot (Figs. 2 and 4) and the lugs 26 on the lid are approximately completely beneath the lugs 24 of the pot, the depression 34 in the packing ring 27 lies over the bosses 30 on the pot, so that the edge bead 31 of the packing ring 27 lies on the conical sealing surface 23 on its entire periphery. It is only then that the pressure inside the pot can increase to above the atmospheric pressure.

Figure 6A:
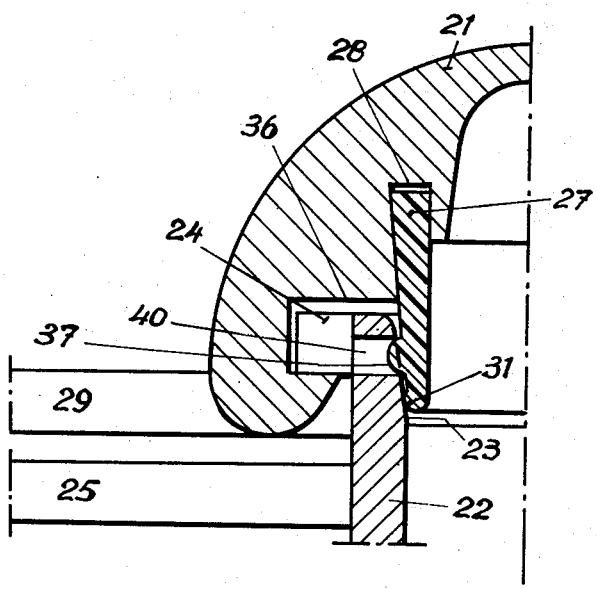

The embodiment of the pressure cooker shown in Figs. 5 and 6 differs from that shown in Figs. 1 and 2 by the fact that the packing ring 27 has, on its external side, bosses 37 which, when the lid 21 is rotated into the locking position, engage in a depression 38 in the conical sealing surface 23 of the pot 22, and the packing ring 27 lies, with its edge bead 31, on the sealing surface 23 on its entire periphery. The bosses 37 on the outer side of the packing ring 27 may be of hemispherical shape (Figs. 5 and 6) or may be rectangular (Fig. 11) or may have some other shape.

Communication of the interior of the pot with the atmosphere during the rotation of the lid, that has been put on the pot, into the locking position, can also be maintained if, as shown in Figs. 7, 8 and 12, the bosses 32a, which engage in the lateral grooves 33 in the lid, are longer than in the case of the embodiments shown in Figs. 1 and 2 and Figs. 5 and 6 and, when the lid is put on the pot, come to lie on the conical sealing surface 23 of the latter (Fig. 7). In this sealing surface 23 there are provided depressions 38a (Figs. 7, 8 and 16), which are open at the edge 35 of the pot, for receiving the bosses 32a, so that the edge bead 31 of the sealing ring 27 lies, on its whole periphery, in the sealing position, as soon as the lid is in the locking position on the pot.

In addition to the lengthened bosses 32a, bosses 37 (Fig. 13) may be provided, in which case a number of depressions 38a, which corresponds to the total number of bosses 32a and 37, are to be provided in the conical sealing surface 23 of the pot. If the bosses 37 are close together, as is the case with the bosses 30 in the embodiment shown in Figs. 1 to 4, a correspondingly widened depression 38a is sufficient for receiving these bosses; this may also be the case with the embodiment shown in Figs. 5 and 6.

Instead of depressions 38 or 38a in the conical sealing surface 23 of the pot, there may be provided, as shown in Figs. 9, 10, 17 and 18, edge depressions 39 in the edge 35 of the pot which lie above the edge bead 31 of the packing ring 27, when the latter is located in the sealing position when the lid is in the locking position. The dimensions of such edge depressions 39, which may also be present in the embodiment shown in Figs. 5 and 6, depend upon the number of bosses present which lie next to one another and which need not be limited to two bosses as shown in Figs. 11 and 13, and upon the size of the angle through which, after interruption of the communication between the interior of the pot and the atmosphere, the lid can still be rotated from the position shown in Fig. 4 until it reaches the position of complete locking, which is reached after the handle 29 of the lid is vertically above the handle 25 of the pot.

The sealing device described may also be employed in the case of pots which have a sealing surface 23 of cylindrical shape instead of the conical sealing surface. Packing rings 27 provided with bosses 37 may also be employed as sealing members on pots which, instead of the depressions 38 shown in Figs. 5 and 6, have window-like wall apertures 40, provided in the wall of the pot 22 of the modification of this embodiment, illustrated in Figs. 5a and 6a.

The locking position of the lid can, in the case of pressure cookers in which the lid and the pot are each provided with a handle that enables it to be grasped, be very easily impressed on the memory, as is shown in practice. However, this locking position remains unaltered only as long as the packing ring 27 cannot change its position in relation to the lid. Certainty in this respect is obtained positively by the arrangement of the bosses 32 and 32a on the outer side of the packing ring. These bosses are also a means which renders it impossible to insert the packing ring 27 into the groove 28 in the lid in the case of an inwardly turned outer side. Since, in such an inverted position, the packing ring would be quite ineffective, the bosses provide a guarantee for a correct insertion of the packing ring if it has to be removed and replaced for any reason.

What I claim is:

1. In a pressure cooker, comprising a pot having a rim, an annular sealing surface on the inner side wall of said pot adjacent said rim, a detachable lid fitting onto said rim, first locking means integral with said pot, second locking means integral with said lid and adapted to engage said first locking means so as to tightly secure said lid to said pot in a predetermined position and to release said lid when said lid is angularly displaced from said predetermined position, and an annular sealing member attached to said lid, projecting downwardly inside of and adjacent to said rim of said pot and having a sealing surface adapted to laterally contact said annular sealing surface of said pot adjacent said rim when said lid is secured to said pot by said locking means, the provision of at least one protuberance at one of said sealing surfaces and of at least one recess at the other of said sealing surfaces, said protuberance and said recess being positioned at their respective sealing surfaces at such places and having such forms and sizes that at said predetermined position of said lid said protuberance engages in said recess to permit sealing engagement of said sealing surfaces, whereas said protuberance is moved from said recess and separates said sealing surfaces when said lid is angularly displaced on said pot with respect to said predetermined position.

2. In a pressure cooker according to claim 1, wherein said sealing member ends in an edge bead somewhat extending over said sealing surface of said member and adapted to annularly contact said sealing surface of said pot.

3. In a pressure cooker according to claim 1, wherein said protuberance is at said sealing surface of said pot and said recess is at said sealing surface of said annular sealing member.

4. In a pressure cooker according to claim 1, wherein said recess is at said sealing surface of said pot and said protuberance is at said sealing surface of said annular sealing member.

5. In a pressure cooker according to claim 1, wherein said recess is extending substantially parallel with respect to the edge of its sealing surface over a larger distance than the lateral extension of said corresponding protuberance.

6. In a pressure cooker according to claim 1, wherein several protuberances adjacent one another are provided to engage in one of said recesses.

7. In a pressure cooker according to claim 1, wherein said protuberance has the form of a boss.

8. In a pressure cooker according to claim 1, wherein said recess is a groove running substantially parallel with respect to the edge of its sealing surface.

9. In a pressure cooker according to claim 1, wherein said recess is a cutout in said rim of said pot and said protuberance is at said sealing surface of said annular sealing member.

10. A pressure cooker, comprising in combination, a pot having a rim; an annular sealing surface on the inner side wall of said pot adjacent said rim; a detachable lid fitting onto the rim of said pot; first locking means integral with the rim of said pot; second locking means integral with the edge of said lid and adapted to engage said first locking means so as to tightly secure said lid to said pot in a predetermined position and to release said lid when said lid is turned for a predetermined angle in either direction; an annular sealing member secured to said lid, projecting downwardly inside of and adjacent and opposite said rim of said pot and having a sealing surface adapted to laterally contact said annular sealing surface of said pot when said lid is secured to said pot by said locking means; at least one protuberance on one of said sealing surfaces and at least one recess in the other of said sealing surfaces, said recess being substantially of the same depth than the height of said protuberance, said protuberance and said recess being positioned on their respective sealing surfaces at such locations and having such dimensions that at said predetermined position of said lid said protuberance engages in said recess to permit sealing engagement between said sealing surfaces, whereas said protuberance upon angular displacement of said lid with respect to said pot from said predetermined position is moved from said recess to act as separator between said sealing surfaces.

11. A pressure cooker according to claim 10, wherein said lid has an annular channel open towards the interior of said pot when said lid is placed on said pot, wherein said sealing member in form of a ring of resilient material is partially inserted in said channel to be held therein and projecting therefrom, where in one of the side walls of said channel has at least one indentation and wherein said sealing member has at least one boss at a corresponding position to fill said indentation and thereby prevent lateral displacement of said sealing member in and with respect to said lid.

12. A pressure cooker according to claim 11 wherein said recess is provided at said annular sealing surface of said pot, wherein said boss of said sealing member is extended to form a common lug with said protuberance adapted to enter said recess.

MAX KELLER.

References Cited in the file of this patent

UNITED STATES PATENTS

| Number | Name | Date |
|---|---|---|
| 2,134,759 | Howlett | Nov. 1, 1938 |
| 2,516,202 | Graham | July 25, 1950 |
| 2,552,642 | Morrison | May 15, 1951 |
| 2,600,703 | Strom | June 17, 1952 |
| 2,600,714 | Wenscott | June 17, 1952 |
| 2,608,318 | Keller | Aug. 26, 1952 |